United States Patent [19]

Walton et al.

[11] Patent Number: 4,928,138
[45] Date of Patent: May 22, 1990

[54] POWER SUPPLY WITH INTEGRAL FILTER AND COOLING DEVICE

[75] Inventors: Derek N. Walton, Roscoe; Richard J. Hoppe, Rockford, both of Ill.

[73] Assignee: Sundstrand Corporation, Rockford, Ill.

[21] Appl. No.: 374,136

[22] Filed: Jun. 30, 1989

[51] Int. Cl.$^5$ ............................................. H02M 1/12
[52] U.S. Cl. ...................................... 363/40; 336/69; 361/384; 363/141
[58] Field of Search ............... 361/383, 384, 382, 385; 363/39, 40, 123, 141; 336/69

[56] References Cited

U.S. PATENT DOCUMENTS

| | | | |
|---|---|---|---|
| 2,287,170 | 11/1940 | Ganz | 175/356 |
| 2,942,214 | 5/1960 | Fruengel | 336/61 |
| 3,657,632 | 4/1972 | Miyoshi | 363/141 |
| 3,704,390 | 11/1972 | Grahame | 336/69 |
| 3,913,045 | 10/1975 | Von Starck | 336/60 |
| 4,764,684 | 8/1988 | Fiorina et al. | 363/39 |

FOREIGN PATENT DOCUMENTS 99762  5/1988  Japan .

Primary Examiner—William H. Beha, Jr.
Attorney, Agent, or Firm—Antonelli, Terry, Stout & Kraus

[57] ABSTRACT

A power supply in accordance with the present invention includes a chassis (26) associated with the power supply; a voltage source (12) providing an output voltage varying at a fundamental frequency and having a noise component changing as a function of time at a frequency above the fundamental frequency; a filter (41) including an inductance (44) in series with the voltage source for attenuating the noise component and outputting the fundamental frequency; and a cooling apparatus (42) thermally and capacitively coupled to the inductor for conducting heat from the inductor and shunting the noise component to the chassis.

25 Claims, 3 Drawing Sheets

POWER SUPPLY WITH INTEGRAL FILTER AND COOLING DEVICE

CROSS REFERENCE TO RELATED APPLICATION

Reference is made to U.S. Pat. Ser. No. 296,830 entitled "Inductor Transformer Cooling Apparatus" filed Jan. 13, 1989 which is assigned to the assignee of the present application which application is incorporated herein by reference in its entirety.

TECHNICAL FIELD

The present invention relates to power supplies utilizing at least one switch having on and off states which are switched to produce an output potential. More particularly, the present invention relates to power supplies of the aforementioned type which are used in airframes to convert DC to three phase AC.

BACKGROUND ART

FIG. 1 illustrates a prior art DC to AC converter 10 of the type utilized in airframes for converting a DC source to three phase alternating current. The converter 10 utilizes a conventional power inverter 12 which contains at least two pairs of power switches such as transistors (not illustrated) associated with each phase that are alternately switched on and off to produce a square wave having a fundamental frequency equal to the desired frequency of alternating current to be outputted on a phase output 14. An LC filter 16 is connected in series between the respective phase A, phase B, and phase C outputs of the power inverter and the phase outputs 14. The LC filter is comprised of an inductor 18 and a feed-through capacitor 20. The LC filter 16 attenuates frequency components present in the phase A, phase B and phase C outputs from the power inverter 12 to produce distinct phases of filtered alternating current at the fundamental frequency displaced 120° apart from each other on the outputs 14. The power switches within the power inverter 12 are switched alternately on to connect the positive DC potential 22 and the negative DC potential 24 to the phase A, phase B and phase C outputs of the power inverter 12 with a phase displacement of 120° from each other. The phase displaced squarewave outputs on the phase A, phase B and phase C outputs of the power inverter 12 contain substantial frequency components above the fundamental frequency of the squarewave. Each LC filter 16 functions such that the impedance of the inductor 18 attenuates frequency components higher than the fundamental frequency and the feedthrough capacitor 20 represents a low impedance to frequency components higher than the fundamental frequency which are shunted to the chassis 26 to cause the filtered outputs to be present on the phase outputs 14 without substantial frequency components above the fundamental frequency.

In applications of the power supply 10 in airframes 28, the capacity of the power supply is typically rated in kilowatts such as 75/90 kw per airframe propulsion engine. In variable speed constant frequency (VSCF) airframe power generator systems an alternator is driven by a power takeoff from an airframe propulsion engine to produce three phase variable frequency AC current which is rectified by a rectifier bridge to produce the DC potentials 22 and 24. In the aforementioned airframe applications the inductors 18 and capacitors 20 must be rated to handle substantial energy. As a result it is desirable for the inductors 18 to have a cooling apparatus to lower their operating temperature. Furthermore, the feedthrough capacitors 20 which are rated for the aforementioned high power applications may typically weigh two pounds or more which represents a weight and size penalty for airframe applications where saving of space and weight is of great importance in the overall efficient operation of the airframe. Accordingly, the prior art power supply 10 in high power generating applications in airframes suffers from the dual disadvantages that the inductors 18 require cooling to stabilize their operating temperature to provide longlife service conditions and further that the size of the individual feedthrough capacitors 20 represents a weight penalty.

DISCLOSURE OF THE INVENTION

The present invention provides a power supply which is lighter in weight than the prior art of FIG. 1 and further provides for temperature control of the inductors utilized in the LC filter without degradation of the LC filter in attenuating high order harmonics of the fundamental frequency of the alternating current produced by the power supply. With the invention the feedthrough capacitors 20 may be at least downsized in size and depending upon the size of the cooling apparatus associated with each inductor the requirement for a feedthrough capacitor connecting the output of the inductor to the chassis may be eliminated. The downsizing or elimination of the feedthrough capacitors is achieved by coupling the capacitance of the cooling apparatus associated with each inductor directly to the chassis to provide a capacitance functionally equivalent to the capacitance provided by the individual feedthrough capacitors described above with respect to the prior art of FIG. 1. Furthermore, coupling of the cooling apparatus which is proximate to the windings of the inductors provides an electrical path which couples differential and common mode noise at a frequency above the fundamental frequency of the AC current produced by the power supply of the power inverter 12 directly to the chassis to eliminate differential and common mode noise from the three phase alternating current produced by the power supply applied to electrical loads.

A power supply in accordance with the invention includes a chassis associated with the power supply; a voltage source providing an output voltage varying at a fundamental frequency and having a noise component changing as a function of time at a frequency above the fundamental frequency; a filter including an inductance in series with the voltage source for attenuating the noise component and outputting the fundamental frequency; and a cooling apparatus thermally and capacitively coupled to the inductor for conducting heat from the inductor and shunting the noise component to the chassis. Preferably, the filter includes the capacitance coupling the inductor electrically to the chassis. The capacitance may be totally contained within the cooling apparatus or alternatively may be distributed between the cooling apparatus and an additional feedthrough capacitor as in the prior art which may be downsized as a consequence of the capacitance present in the cooling apparatus.

The inductor comprises a plurality of turns of electrically conductive material and the cooling device comprises at least one heat conductive member spaced between adjacent turns of the electrically conductive material with each member being electrically coupled to the chassis. Preferably, the cooling apparatus contains a plurality of heat conductive members which are each spaced between different adjacent turns of the electrically conductive material with the members being uniformly spaced apart. Each of the heat conductive members may be attached to an electrically conductive member which is electrically coupled to and connected to the chassis.

The voltage source may be a three phase inverter located in an airframe producing three separate phases of alternating current with each phase having an output with the filter including an inductance in series with each output for attenuating the noise component and outputting a phase of the output voltage; and the cooling device is thermally and capacitively coupled to each of the inductors for conducting heat from each of the inductors and shunting the noise component to the chassis.

The inductors may comprise a magnetically permeable core on which the turns of conductive material are wound; and each of the cooling members is disposed between adjacent turns and is adjacent to the core.

BEST MODE FOR CARRYING OUT THE INVENTION

The present invention is a power supply having a high rated output power rating which utilizes a cooled inductor in an LC filter for attenuating noise above a fundamental frequency of alternating current produced by the power supply. The present invention eliminates the requirement for a feedthrough capacitor as described above with respect to the prior art which represents a weight and spatial savings for applications such as airframes and further eliminates deleterious effects consequent from plates of a cooling apparatus associated with the inductor for dissipating heat during operation of the inductor by eliminating the shunting of the inductance by the inherent capacitance of the cooling apparatus. With the invention the cooling apparatus of the inductor is thermally and capacitively coupled to windings of the inductor and to the chassis associated with the power supply to shunt both common mode noise and differential noise caused by the switches such as power transistors within the inductor to eliminate coupling noise to the output of the power supply.

U.S. patent application Ser. No. 296,830 discloses an inductor for use in high power applications such as the present invention. It has been discovered that the use of inductors in accordance with the aforementioned patent application results in high frequency noise caused by the switching of the switches within the inverter bypassing the inductor which is intended to attenuate these high frequencies. As a result the effectiveness of the LC filter in attenuating high frequency noise components is diminished.

Figure 1:
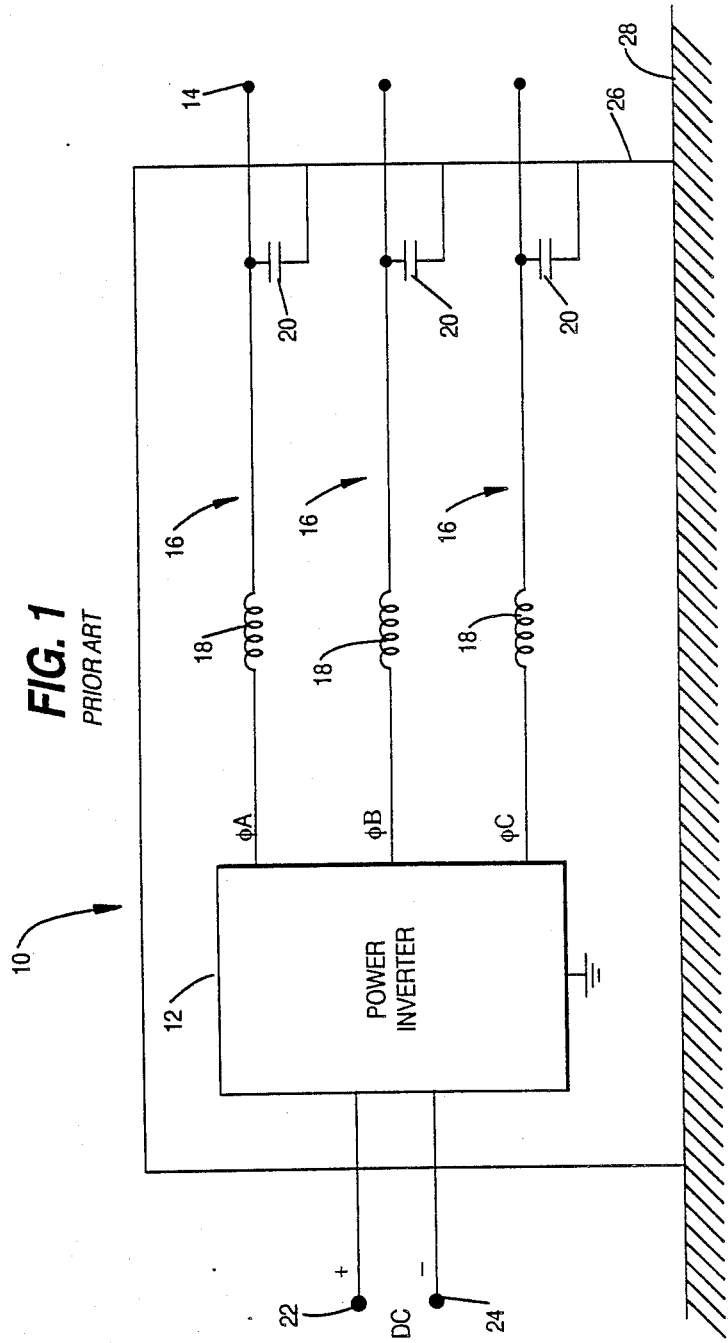
FIG. 1 illustrates a prior art VSCF power supply of the type utilized in airframes.
Figure 2:
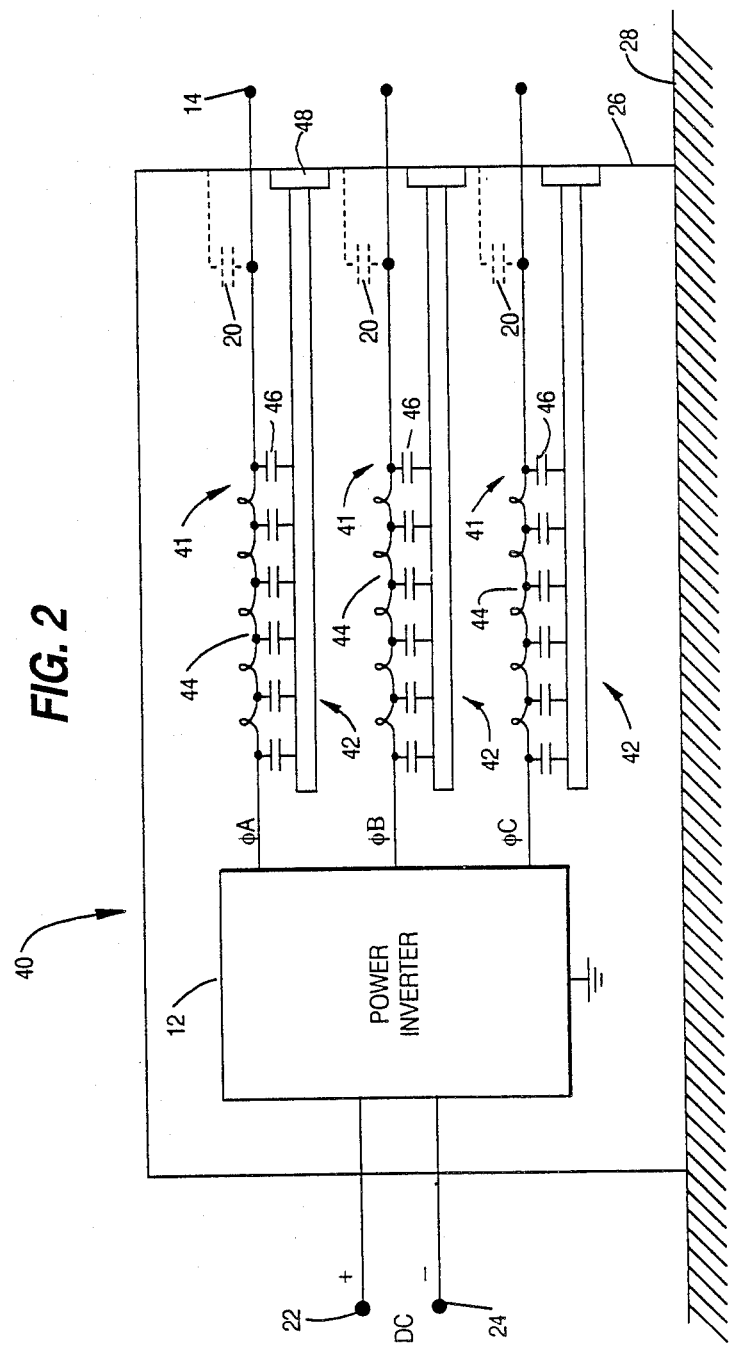
FIG. 2 illustrates an electrical schematic of a power supply in accordance with the present invention.
Figure 3:
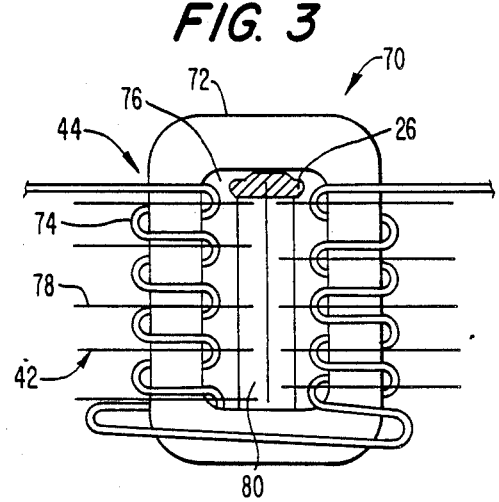
FIG. 3 illustrates a first embodiment of an inductor for use in a filter of the power supply of the present invention including integral cooling structures.
Figure 4:
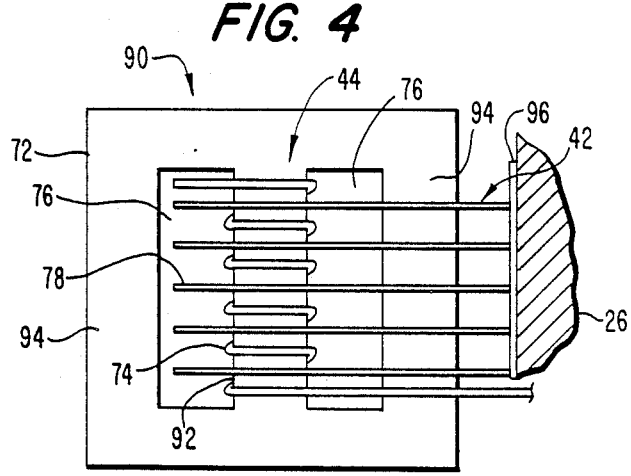
FIG. 4 illustrates a second embodiment of an inductor for use in a filter of the power supply of the present invention including integral cooling structures.
Figure 5:
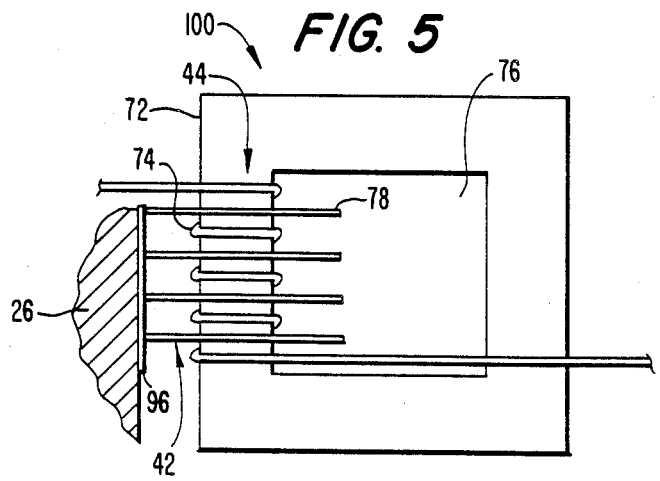
FIG. 5 illustrates a third embodiment of an inductor for use in a filter of the power supply of the present invention including integral cooling structures.

FIG. 2 illustrates an embodiment 40 with a power supply in accordance with the present invention. Like reference numerals identify like parts in FIGS. 1 and 2. The embodiment of FIG. 2 differs from FIG. 1 in that each phase outputted by the power inverter is coupled in series with a cooling apparatus 42 which is thermally and electrically coupled to an inductor 44 which performs the function of the LC filter 16 of FIG. 1. FIGS. 3–5 described below illustrate suitable embodiments for implementing the inductor 44 of FIG. 2. The cooling apparatus 42 functions as a cold plate with the cold plate structures not being illustrated in FIG. 2. As is described below with reference to FIGS. 3–5, at least one cooling apparatus is thermally and capacitively coupled to windings of the inductor for conducting heat from the inductor and shunting the noise component to the chassis 26. The capacitances 46 represent the capacitance between the heat conductive members and the windings of the inductor as described below with reference to FIGS. 3–5. As illustrated the capacitance of the cooling apparatus 42 associated with the windings of the inductor 44 and the heat conductive members of the cooling apparatus couples high frequency noise to the chassis 26 which eliminates the problem described above with respect to the inductors disclosed in Ser. No. 296,830 wherein the cooling structure causes bypassing of the inductance which prevents the attenuation of high frequency components which the inductor was intended to attenuate. As illustrated the cooling mechanism 42 is attached to the chassis 26 by any suitable mounting mechanism 48. Furthermore, the overall function of the cooling mechanism is to provide a cold plate which thermally conducts heat away from the windings of the inductor 44. It should be understood that numerous configurations of the cooling apparatus 42 may be utilized in practicing the invention with the objective being that the cooling mechanism must be mounted in association with the windings of the inductance 44 to provide a thermal heat sink for heat generated during filtering of alternating current outputted by the power inverter 12 and further providing capacitive coupling between the windings of the inductor 44 and the chassis 26 to prevent high frequency harmonics of the fundamental frequency bypassing the windings of the inductor which is intended to attenuate high frequency harmonics of the fundamental frequency.

FIG. 3 illustrates a first embodiment of an inductor and cooling apparatus 42 in the embodiment of FIG. 2. Like reference numerals identify like parts in FIGS. 2 and 3. The inductor has a magnetic permeable core 72 on which a plurality of turns of conductive material (wire) 74 are wound around the core. As illustrated, the core is closed to form an annulus 76. The core 72 may be laminated to minimize eddy currents and other losses and further is intended to provide maximum magnetic linkage between the turns 74 of the inductor 44 to provide maximum inductance. The turns 74 are wound around two opposed sides of the core. The cooling apparatus 42 is comprised of a plurality of evenly spaced members 78 which are attached to a central member 80 which is attached to the chassis 26 in a conventional manner. The members 78 and 80 are electrically and thermally conductive to provide thermal coupling of heat absorbed by the member 78 from the turns 74 of the inductor and to capacitively couple the turns to the chassis 26 to provide coupling of high frequency harmonics to the chassis to prevent outputting of the harmonics to the phase outputs 14 of the power supply in which the inductor 70 is mounted as part of an LC filter. A suitable material for implementing the members 78 and 80 is copper. The spacing of the members 78 may be between every adjacent turn 74 or at uniformly spaced intervals between groups of adjacent turns. It should be further understood that the individual members 78 may be bifurcated to fit on both sides of the opposed sides of the core 72 with respect to the depth of the illustration of FIG. 3 or alternatively may be disposed on one side. The advantage of a bifurcated configuration is that maximum heat transfer is provided from the turns 74 of the conductive material to the members 78 and further maximum surface area is provided to maximize the capacitive coupling between the turns and the chassis 26 which makes it possible to either totally eliminate the prior art feedthrough capacitor or substantially reduce it in size and weight with the attendant advantage for applications in which spatial and weight of the LC filter is of importance.

FIG. 4 illustrates a second embodiment 90 of a cooling apparatus 42 and inductor 44 which may be utilized in the system of FIG. 2. Like reference numerals identify like parts in FIGS. 2-4. The embodiment 90 of FIG. 4 differs from that of FIG. 3 in that the core 72 has a center section 92 which is magnetically linked to side sections 94. The center section 92 and side section 94 form a pair of annuli 76. The turns of the conductive material 74 are wound on the center section 92. The core 72 is a magnetically permeable material which may be laminated to reduce eddy currents and other losses in accordance with FIG. 3. The individual members 78 are attached to member 96 which is attached to the chassis 26 by a suitable mounting mechanism not illustrated. The members 78 may be bifurcated in the same manner as described above with reference to FIG. 3. The inductor 90 of FIG. 4 operates in the same manner as the inductor 70 of FIG. 3 operates in the power supply of FIG. 2.

FIG. 5 illustrates a third embodiment 100 of the cooling mechanism 42 and inductor 44 of the power supply of FIG. 1. Like reference numerals identify like parts in FIGS. 2-5. The embodiment of FIG. 5 differs from the embodiment of FIG. 3 only in that the turns 74 of the inductor are wound on one side of the core 72 instead of on two sides as illustrated in FIG. 3.

While the invention has been described in terms of its preferred embodiments, it should be understood that numerous modifications may be made thereto without departing from the spirit and scope of the invention as defined in the appended claims. For example, with reference to FIG. 2, it should be understood that the structural configuration of the cooling apparatus 42 may take many different forms from those illustrated in FIGS. 3-5 with the embodiments of FIGS. 3-5 only be exemplary of possible implementations of the cooling apparatus 42 and inductor 44 utilized with each phase of a LC filter in a power supply in accordance with the present invention. Furthermore, while the invention is preferably for use in airframes, it should be understood that the invention may be applied to other applications with equal facility. It is intended that all such modifications fall within the scope of the appended claims.

We claim:

1. A power supply comprising:
   a chassis;
   a voltage source providing an output voltage varying at a fundamental frequency and having a noise component varying as a function of time at a frequency above the fundamental frequency;
   a filter including an inductance in series with the voltage source for attenuating the noise component and outputting the fundamental frequency; and
   a cooling apparatus thermally and capacitively coupled to the inductor for conducting heat from the inductor and coupling the noise component to the chassis.

2. A power supply in accordance with claim 1 wherein:
   the filter further includes a capacitance coupling the inductor to electrically to the chassis.

3. A power supply in accordance with claim 2 wherein:
   the capacitance comprises the cooling device.

4. A power supply in accordance with claim 2 wherein:
   the capacitance consists of the cooling device.

5. A power supply in accordance with claim 1 wherein:
   the inductor comprises a plurality of turns of an electrically conductive material; and
   the cooling apparatus comprises at least one heat conductive member spaced between adjacent turns of the electrically conductive material with each plate being electrically coupled to the chassis.

6. A power supply in accordance with claim 5 wherein the cooling apparatus comprises:
   a plurality of heat conductive members which are each spaced between different adjacent turns of the electrically conductive material with the members being uniformly spaced apart.

7. A power supply in accordance with claim 6 wherein:
   each of the heat conductive members is attached to an electrically conductive member which is electrically coupled to and connected to the chassis.

8. A power supply in accordance with claim 2 wherein:
   the inductor comprises a plurality of turns of an electrically conductive material; and
   the cooling apparatus comprises at least one heat conductive member spaced between adjacent turns of the electrically conductive material with each plate being electrically coupled to the chassis.

9. A power supply in accordance with claim 8 wherein the cooling apparatus comprises:
   a plurality of heat conductive members which are each spaced between different adjacent turns of the electrically conductive material with the members being uniformly spaced apart.

10. A power supply in accordance with claim 9 wherein:
    each of the heat conductive members is attached to an electrically conductive member which is electrically coupled to and connected to the chassis.

11. A power supply in accordance with claim 3 wherein:
    the inductor comprises a plurality of turns of an electrically conductive material; and
    the cooling apparatus comprises at least one heat conductive member spaced between adjacent turns of the electrically conductive material with each plate being electrically coupled to the chassis.

12. A power supply in accordance with claim 11 wherein the cooling apparatus comprises:
a plurality of heat conductive members which are each spaced between different adjacent turns of the electrically conductive material with the members being uniformly spaced apart.

13. A power supply in accordance with claim 12 wherein:
each of the heat conductive members is attached to an electrically conductive member which is electrically coupled to and connected to the chassis.

14. A power supply in accordance with claim 4 wherein:
the inductor comprises a plurality of turns of an electrically conductive material; and
the cooling device comprises at least one heat conductive member spaced between adjacent turns of the electrically conductive material with each plate being electrically coupled to the chassis.

15. A power supply in accordance with claim 14 wherein the cooling apparatus comprises:
a plurality of heat conductive members which are each spaced between different adjacent turns of the electrically conductive material with the members being uniformly spaced apart.

16. A power supply in accordance with claim 15 wherein:
each of the heat conductive members is attached to an electrically conductive member which is electrically coupled to and connected to the chassis.

17. A power supply in accordance with claim 1 wherein:
the voltage source is a three phase inverter producing three separate phases of alternating current with each phase having an output and is located in an airframe with the filter including an inductance in series with each output for attenuating the noise component and outputting a phase of the fundamental frequency; and
a cooling apparatus is thermally and capacitively coupled to each of the inductors for conducting heat from each of the inductors and shunting the noise component to the chassis.

18. A power supply in accordance with claim 2 wherein:
the voltage source is a three phase inverter producing three separate phases of alternating current with each phase having an output and is located in an airframe with the filter including an inductance in series with each output for attenuating the noise component and outputting a phase of the fundamental frequency; and
a cooling apparatus is thermally and capacitively coupled to each of the inductors for conducting heat from each of the inductors and shunting the noise component to the chassis.

19. A power supply in accordance with claim 3 wherein:
the voltage source is a three phase inverter producing three separate phases of alternating current with each phase having an output and is located in an airframe with the filter including an inductance in series with each output for attenuating the noise component and outputting a phase of the fundamental frequency; and
a cooling apparatus is thermally and capacitively coupled to each of the inductors for conducting heat from each of the inductors and shunting the noise component to the chassis.

20. A power supply in accordance with claim 4 wherein:
the voltage source is a three phase inverter producing three separate phases of alternating current with each phase having an output and is located in an airframe with the filter including an inductance in series with each output for attenuating the noise component and outputting a phase of the fundamental frequency; and
a cooling apparatus is thermally and capacitively coupled to each of the inductors for conducting heat from each of the inductors and shunting the noise component to the chassis.

21. A power supply in accordance with claim 17 wherein:
each inductor comprises a plurality of turns of an electrically conductive material; and
the cooling apparatus comprises at least one heat conductive member spaced between adjacent turns of the electrically conductive material with each plate being electrically coupled to the chassis.

22. A power supply in accordance with claim 21 wherein the cooling apparatus comprises:
a plurality of heat conductive members which are each spaced between different adjacent turns of the electrically conductive material with the members being uniformly spaced apart.

23. A power supply in accordance with claim 22 wherein:
each of the heat conductive members is attached to an electrically conductive member which is electrically coupled to and connected to the chassis.

24. A power supply in accordance with claim 6 wherein:
the inductor comprises a magnetically permeable core on which the turns of conductive material are wound; and
each of the members is disposed between adjacent turns and is adjacent to and thermally coupled to the core.

25. A power supply in accordance with claim 7 wherein:
the inductor comprises a magnetically permeable core on which the turns of conductive material are wound; and
each of the members is disposed between adjacent turns and is adjacent to and thermally coupled to the core.

* * * * *